Jan. 9, 1951  M. L. BETTCHER  2,537,392
ANTISKID TIRE CHAIN
Filed Aug. 13, 1948  2 Sheets-Sheet 1
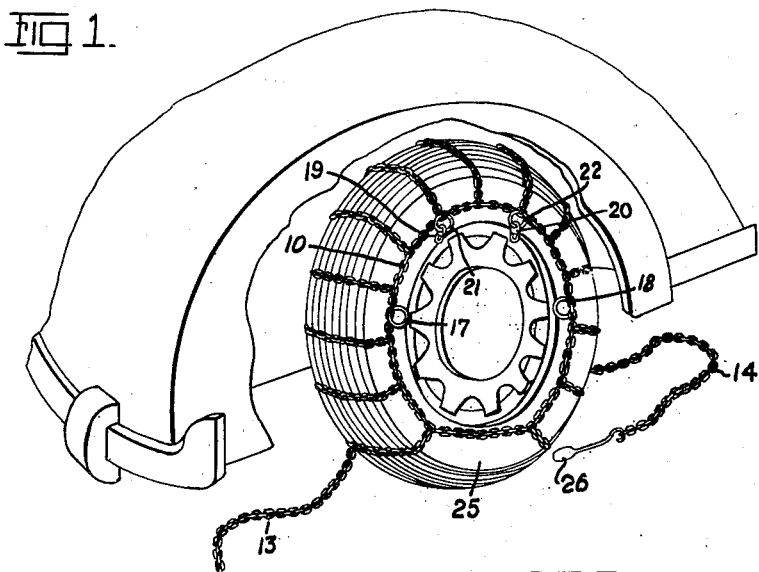
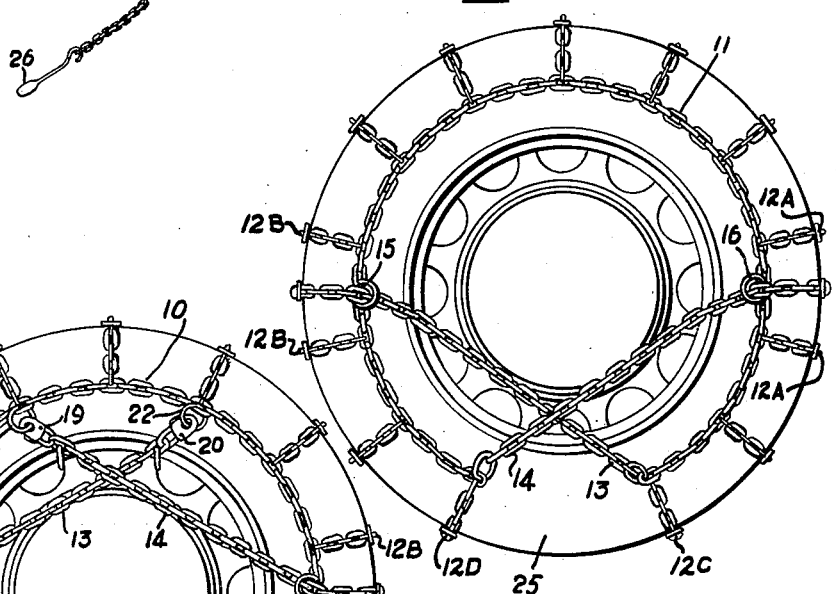
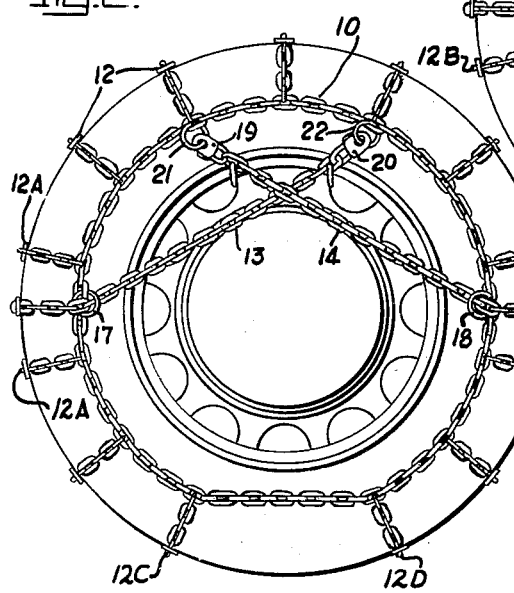
INVENTOR
MORTIMER L. BETTCHER.
BY
Toulmin & Toulmin
ATTORNEYS Jan. 9, 1951 M. L. BETTCHER 2,537,392
ANTISKID TIRE CHAIN
Filed Aug. 13, 1948 2 Sheets-Sheet 2
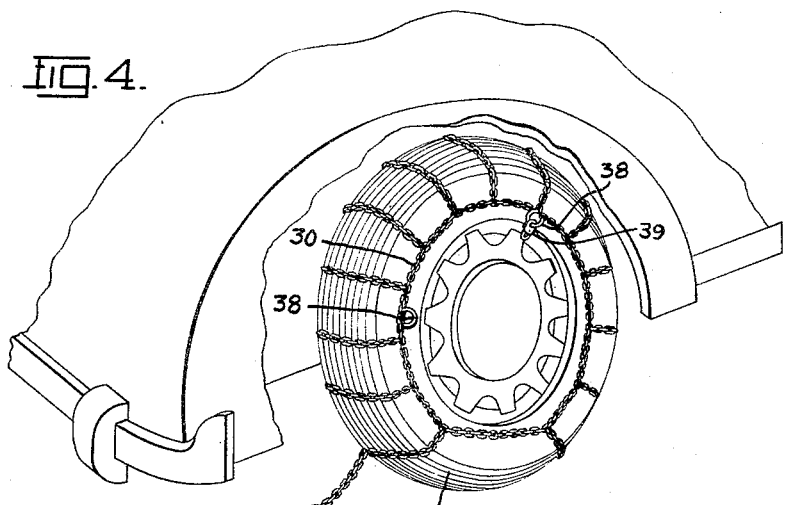
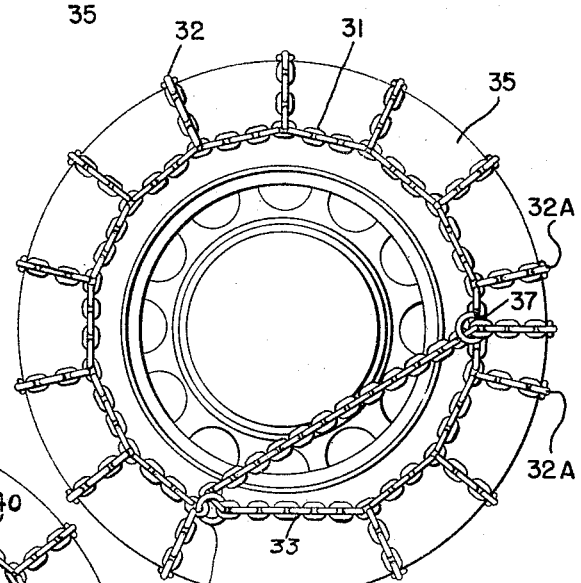
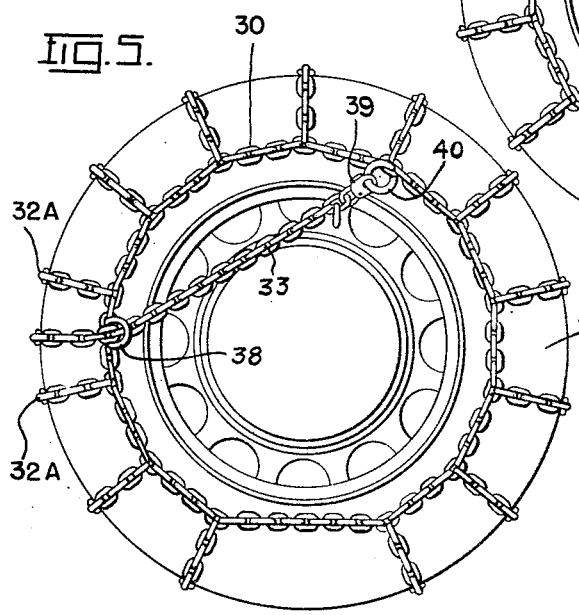
INVENTOR
MORTIMER L. BETTCHER,
BY
Toulmin & Toulmin
ATTORNEYS Patented Jan. 9, 1951

2,537,392

UNITED STATES PATENT OFFICE 2,537,392

ANTISKID TIRE CHAIN

Mortimer L. Bettcher, Dayton, Ohio; Dorothy L. Bettcher Tameling administratrix of said Mortimer L. Bettcher, deceased Application August 13, 1948, Serial No. 44,133

3 Claims. (Cl. 152—241)

This invention relates to tire chains for use on motor vehicles.

It is exceedingly difficult to place tire chains on the wheels of motor vehicles. The usual tire chain has both side chains open or discontinuous so that the chain can be draped over a tire and then, by some manipulation of the car and the wheel, bring the ends of the chain together. This is a dirty, difficult job with the conventional tire chains.

It is therefore an object of this invention to provide a tire chain that will enable a user to place the chains in position on a wheel with less difficulty, and yet be able to hold the chains together tightly while on the wheel.

It is still a further object of the invention to provide a tire chain of the character referred to in the foregoing object wherein the tire chain can be placed on the wheel without the necessity of jacking up the wheel or moving the wheel at any time during the process of placing the tire chain on it.

It is still another object of the invention to provide a tire chain of the character referred to in the foregoing objects wherein the weight of the tire chain will be well balanced, particularly as provided for by the physical symmetry of the chain lengths that are used to hold the tire chain on the wheel.

Further objects and advantages will become apparent from the drawings and the following description.

In the drawings:

Figure 1 is an elevational view illustrating the placement of the tire chain of this invention on the wheel of a motor vehicle.

Figure 2 is a front elevational view of the wheel showing the tire chain in place on the wheel.

Figure 3 is an elevational view of the rear side of the wheel with the tire chain in place on the wheel.

Figure 4 is an elevational view of a modified arrangement of a tire chain as being positioned on the wheel of a motor vehicle.

Figure 5 is an elevational view of the front side of a wheel showing the modified tire chain of the invention in place on the wheel.

Figure 6 is an elevational view showing the rear side of a wheel shown in Figure 5 with the tire chain in place on it.

In this invention the tire chain consists of a continuous side chain 10 and a discontinuous side chain 11. The continuous side chain 10 is to be placed on the front side of the wheel, while the discontinuous side chain 11 is placed against the rear side of the wheel.

A plurality of cross-chains 12 extends between the side chains 10 and 11. The ends of each of the cross-chains are permanently secured to the side chains 10 and 11 in conventional manner.

The discontinuous side chain 11 has a chain length 13 extending from one end thereof and a corresponding chain length 14 extending from the opposite end thereof. These chain lengths 13 and 14 are substantially of the same length as the discontinuous side chain 11 for they must be sufficiently long to extend diagonally across the tire chain, as shown in Figure 3, thence over the tire parallel to the cross-chains 12, and thence diagonally across the front side of the wheel as shown in Figure 2. It will be noted that the chain lengths 13 and 14 are arranged in cross-wise fashion on the front and the rear of the wheel.

The discontinuous side chain 11 is provided with a pair of loops 15 and 16 which may be a part of the side chain 11 or may be attached as free loops to the side chain and through which one of the chain lengths 13, 14 is passed.

As shown in Figure 2, the continuous side chain 10 is also provided with a pair of loops 17 and 18 which may be a part of the side chain 10 or may be attached as free loops to the side chain and through which the chain lengths 13, 14 are also adapted to pass.

The loops 17 and 18 in the continuous side chain 10 are placed between the same adjacent pair of cross-chains 12a and 12b respectively between which the loops 15 and 16 respectively are placed. This provides an arrangement whereby the chain length that extends across the tire is parallel to the cross chains 12. At least this part of the chain lengths 13 and 14 can be of the same chain construction as the cross-chains 12 so that the chain lengths 13 and 14 will not wear any more rapidly than the cross-chains 12. As shown, the links 15, 16, 17 and 18 are so positioned as preferably to be on a horizontal line passing through the center of the wheel.

Snap-fasteners or connectors 19 and 20 are connected to the continuous side chain 10 preferably with the connecting loops 21 and 22, or the connectors 19 and 20 may connect directly to the links of the side-chain 10 if desired. The ends of the chain lengths 13 and 14 are connectable to the snap fasteners 19 and 20 when the chain lengths are drawn tightly into position. Variation in tire size can thus be taken care of.

The cross chains 12c and 12d at the ends of the discontinuous side chain 11 are spaced apart a distance greater than the contact length of a tire with the ground to provide freedom of movement of these cross chains when placing the chain on a tire.

To place the tire chain shown in Figs. 1 to 3 on the wheel of a motor vehicle, the chain is draped over a wheel with the discontinuous side-chain 11 placed to the rear of the wheel, as shown in Fig. 1. The chain lengths 13 and 14 are at this time free so that the space between the ends of the discontinuous chain length 11 will permit free passage of the ends of the discontinuous side-chain 11 around the tire 25 of the wheel, even though the wheel is resting on the ground.

If desired, small weights 26 can be connected to the connectors 19 and 20 so that after the user has draped the tire chain over the wheel, in the manner shown in Fig. 1, the chain lengths 13 and 14 can be swung crosswise across the rear of the wheel 25.

The weights 26 are then removed from the chain lengths and they are threaded through the loops 15 and 16 of the discontinuous side-chain 11 at the rear of the wheel 25 in the manner shown in Fig. 3. To provide for more ease of installation the loops 15 and 16 can be pulled to the forward side of the tire for threading the chain lengths 13 and 14 through the same, and then returned to the rearward side of the tire. The chain lengths 13 and 14 are then brought forward across the tire parallel to the cross-chains 12 and threaded through the loops 17 and 18. The chain lengths will then be pulled tightly to tighten the chain on the wheel and the snap-fasteners 19 and 20 connected to the ends of the chain lengths 13 and 14.

It will be noted that the chain lengths have a physical symmetry on the rear and front side of the wheel to provide for physical weight distribution and thereby avoid any unbalance of the wheel when the chain is placed on the wheel.

It will be further noted that by reason of positioning the links 17, 18 no lower than the horizontal line passing through the center of the wheel, the upward pull on the chain lengths 13, 14 is considerable and serves to tighten the lower portion of the continuous chain 10. This is important since the lowermost portions of the side chains bear the brunt of the thrust as power is applied to the rear wheels, perhaps to pull the car out of a snowbank or to make headway on an icy street. It is imperative that there shall be no slack in the chain structure at the bottom of the tire so that the tire chain tightly hugs the tire at this position, for otherwise any relative movement between the chain and the tire will obviously cut or bruise the tire.

In Figures 4 to 6 there is illustrated a slightly modified arrangement of the tire chain of this invention.

In this modified form, the tire chain consists of a continuous chain length 30 that is placed against the front side of the wheel and a discontinuous chain length 31 that is placed against the rear side of the wheel. Cross-chains 32 are secured at their opposite ends to the side-chains 30 and 31 in conventional manner.

The discontinuous side-chain 31 has a chain length 33 extending therefrom that is substantially as long as the discontinuous side chain 31 so that it can pass through a loop 36 and thence diagonally across the side-chain, as shown in Fig. 6, thence across the tire 35 parallel to the cross-chains 32, and thence diagonally across the continuous side-chain 30 on the front of the wheel, as shown in Fig. 5.

The discontinuous side chain 31 has the loop 36 through which the chain length 33 is passed to draw the chain tightly around the wheel. The discontinuous side-chain 31 is provided with a second loop 37 through which the chain length 33 passes when extending diagonally across the rear of the wheel, as shown in Fig. 6.

The continuous side-chain 30 is provided with a loop 38 through which the chain length 33 passes on the front side of the wheel. This loop 38 is between the same adjacent pair of cross-chains 32a as the loop 37, thus providing for the chain length 33 to pass around the tire parallel to the cross-chains 32. At least the portion of the chain length 33 that is parallel to the cross-chains 32a can be of the same chain construction as the cross-chains.

To place the tire chain on a wheel, the chain is draped over a wheel, as shown in Fig. 4, with the continuous chain at the front of the wheel and the discontinuous chain at the rear of the wheel.

The chain length 33 can then be thrown from one side of the wheel to the other by means of the weight 26a, and the weight then removed. The chain length 33 is then threaded through the loop 36 on the rear of the wheel and thence through the loop 37. By pulling the chain forward over the wheel 35, the chain will be drawn tight.

The chain length 33 is then passed through the loop 38 in the continuous side chain and the connector 39 that is attached to the continuous side-chain 30 is connected to the end of the chain length 33.

While the devices disclosed and described herein constitute preferred forms of the invention, yet it is understood that they can be altered mechanically without departing from the spirit of the invention, and that modifications that fall within the scope of the appended claims are intended to be included herein.

Having thus fully described my invention, what I claim as new and desire to secure by Letters Patent is:

1. A tire chain comprising, a continuous side chain and a discontinuous side chain, a plurality of cross-chains extending between said side chains and permanently secured at their opposite ends to said side chains, said discontinuous side chain having a chain length extending therefrom from each end thereof of substantially the same length as said discontinuous side chain, and connectors on said continuous side chain for connecting to the end of each of said chain lengths, said side chains having loops through which said chain lengths can be passed to extend the chain lengths diagonally across one side of the tire chain in crosswise fashion thence across the tire chain parallel to said cross-chains and thence diagonally across the opposite side of the tire chain in crosswise fashion with the diagonal position of the respective chain lengths on one side of the tire being substantially at a right angle to the diagonal position of the respective chain lengths on the opposite side of the tire chain whereby to balance the weight of said chain lengths by symmetric disposition of the said chain lengths on the tire chain, said connectors being connected to the ends of said chain lengths, whereby to hold the tire chain on a tire.

2. A tire chain comprising, a continuous side chain and a discontinuous side chain, a plurality of cross-chains extending between said side chains and permanently secured at their opposite ends to said side chains, said cross chains extending between the ends of said discontinuous side chain and said continuous side chain being spaced apart at their connection to said continuous side chain a distance greater than the normal contact length of a tire with the ground, said discontinuous side chain having a chain length extending from each end thereof of substantially the same length as said discontinuous side chain, said discontinuous side chain having a pair of loops through which said chain lengths can be passed, said loops being positioned on said discontinuous side chain relative to opposite ends thereof that said chain lengths are positioned diagonally across the tire chain in the plane of the said discontinuous side chain in crosswise fashion when passed through the said loops, a pair of loops on said continuous chain positioned between adjacent cross-chains between which said loops are placed on said discontinuous side chain, and a pair of connectors on said continuous side chain to which said chain lengths are connected, said connectors being positioned on said continuous side chain that said chain lengths are positioned diagonally across the tire chain in the plane of the continuous side chain in crosswise fashion when connected to said connectors, said loops being positioned on a level coinciding with a line drawn through the center of the tired wheel to which the chain is applied.

3. A tire chain including, a continuous side chain and a discontinuous side chain, a plurality of cross-chains extending between said side chains and permanently secured at their opposite ends to said side chains, said cross chains extending between the ends of said discontinuous side chain and said continuous side chain being spaced apart at their connection to said continuous side chain a distance greater than the normal contact length of a tire with the ground, said discontinuous side chain having a chain length extending therefrom of substantially the same length as the said discontinuous side chain, and a connector on said continuous side chain for connecting to the end of said chain length, said side chains having loops through which said chain length can be passed to extend the chain length diagonally across one side of the tire chain, thence across the same parallel to said cross-chains and thence diagonally across the opposite side of the tire chain with said connector connected to the end of said chain length whereby to hold the tire chain on a tire, said loops being positioned on a level coinciding with a line drawn through the center of the tired wheel to which the chain is applied.

MORTIMER L. BETTCHER.

REFERENCES CITED

The following references are of record in the file of this patent:

UNITED STATES PATENTS

| Number | Name | Date |
|---|---|---|
| 1,473,797 | Servis | Nov. 13, 1923 |
| 2,436,709 | Bozenhard | Feb. 24, 1948 |

FOREIGN PATENTS

| Number | Country | Date |
|---|---|---|
| 525,941 | Great Britain | Sept. 6, 1940 |